Sept. 18, 1962

A. GALOPIN 3,054,908

SELECTIVE BIPOLARITY SWITCHING NETWORK FOR MEMORY ARRAYS

Filed June 3, 1958

2 Sheets-Sheet 1

INVENTOR.
ANTHONY GALOPIN
BY Morris L. Rabkin

ATTORNEY

INVENTOR.
ANTHONY GALOPIN
BY Morris A. Rabkin
ATTORNEY

United States Patent Office 3,054,908

Patented Sept. 18, 1962

3,054,908

SELECTIVE BIPOLARITY SWITCHING NETWORK FOR MEMORY ARRAYS

Anthony Galopin, Arlington, Mass., assignor, by mesne assignments, to the United States of America as represented by the Secretary of the Air Force Filed June 3, 1958, Ser. No. 739,607
3 Claims. (Cl. 307—88.5)

This invention relates to switching networks, and particularly to transistor switching networks.

Switching networks are used in applications involving the selection of a desired one of a plurality of signal lines. Switching networks are also used in gating applications. For example, in memory systems relatively large amplitude selecting currents may be gated to various memory input lines under the control of the switching network. Transistors are desirable for use in switching networks because of their reliability, their small size, their low operating power, etc.

In practice, it is found that the operation of the individual storage elements of the memory system is influenced by the amplitude and waveshape of the selecting signals. Therefore, it is desirable that the switching network transmit the selecting current without distorting the waveshape and without any appreciable attenuation.

Certain of the prior transistor switching networks require additional external gating stages to control the relatively large amplitude selecting currents. Certain other of the prior transistor switching networks operated the transistors at or close to their rated dissipation. By so operating the transistors, the reliability of the system is reduced; the transistors must be carefully graded, and the duty factor of the system is relatively low compared to that which would otherwise be possible.

It is an object of the present invention to provide improved transistor switching networks.

Another object of the present invention is to provide transistor switching networks capable of switching relatively large amplitude currents in an efficient manner and with a high duty factor.

Still another object of the present invention is to provide improved transistor switching networks that require less equipment than certain of the prior transistor switching networks.

According to the present invention, the individual output lines of the switching network are each controlled by means of a different switching transistor. The switch means for the respective output lines are selectively activated to pass signals from the input terminal to the output terminal by means of control networks under the influence of coded control signals. Each switching transistor is a multi-electrode junction type semi-conductor device operating as a pair of diodes having a common terminal, defined by the base electrode of the transistor, and two other electrodes connected, respectively, to the input and output lines or terminals associated with the transistor. Control signals for selecting a desired one of these transistors are decoded, and the resulting output signal is applied as a base input to the transistor coupled to the desired signal output line. This base input signal forward-biases both the emitter-base and collector-base diodes of the selected transistor and produces an appreciable base current flow in that transistor. This base current flows in both of these forward-biased diodes. A selecting pulse applied to the collector electrodes of all the transistors is then passed by the selected transistor to the desired signal line. Each of the non-selected transistors is nonconductive. The selected transistor is driven to its fully saturated condition by the selecting pulse. The base current flow is substantially unchanged during the presence of the selecting pulse, and the selected transistor remains in its saturated condition throughout the entire selecting operation. Therefore, the selecting pulse is passed by the selected transistor with negligible attenuation and distortion, as appears more fully hereinafter. The selected transistor itself is subjected to relatively little dissipation, even though relatively large amplitude selecting currents are used.

In the accompanying drawings.

Figures 1, 3, 4:
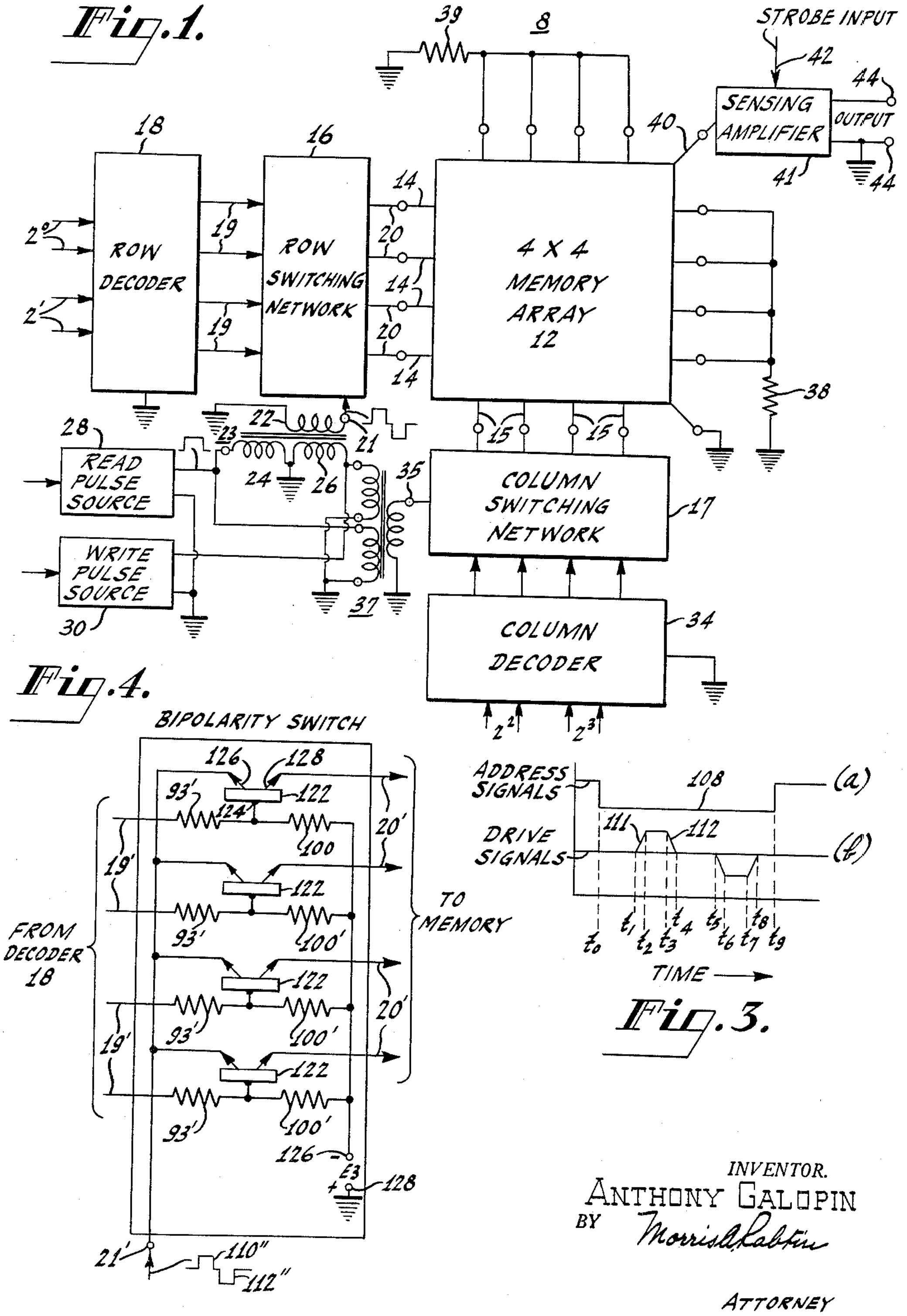
FIG. 1 is a schematic diagram of a memory system in which the switching systems of the present invention may be used.
FIG. 3 is a timing diagram useful in explaining the operation of the switching network of FIG. 2.
FIG. 4 is a schematic diagram of another embodiment of a switching network according to the invention.

The memory system 8 of FIG. 1 has a 4 × 4 array 12 of memory cores controlled by a row switching network 16 and a column switching network 17. The four row lines 14 of the array 12 are individually connected to the four output lines 20 of the row switching network 16. A row decoder 18 is used to control the row switching network 16. The decoder 18 has a pair of binary inputs designated $2^0$ and $2^1$, and four output lines 19. The four output lines 19 of the row decoder 18 are respectively connected to four inputs of the row switching network 16. The row switching network 16 receives read and write pulses at a common input terminal 21 which is connected to the secondary winding 22 of a pulse transformer 23. The two primary winding 24 and 26 of the pulse transformer 23 are respectively connected to the outputs of a read pulse source 28 and a write pulse source 30.

The four column lines 15 of the array 12 are similarly controlled by the column switching network 17 and a column decoder 34. Another pair of binary input signals $2^2$ and $2^3$ are used to select a desired one of the column lines 15. Read and write pulses from the read pulse source 28 and the write pulse source 30 are applied to the common input terminal 35 of the column switching network 17 by means of a second pulse transformer 37.

All the row lines 14 of the array 12 are connected via a resistance element 38 to a common point of reference potential, indicated in the drawing by the conventional ground signal. Another resistance element 39 connects all the column lines 15 to the common ground. Each of the other units of the memory system 8 also may have a common ground connection. A sensing winding 40 is coupled to all the 16 elements of the array 12. The sensing winding 40 is connected to a signal input of a sensing amplifier 41 which has a strobe input 42 and a pair of output terminals 44.

Details of the construction and operation of a memory system arranged as is the memory system 8 of FIG. 1 may be found in a book entitled "Digital Computer Components and Circuits," by R. K. Richards. In general, a desired one of the 16 memory elements is selected by applying selecting pulses to the one row line 14 and the one column line 15 intersecting in that element. During the read operation, the applied pulses are of one polarity, say positive, and during the write operation the applied pulses are of negative polarity. Any suitable control unit, such as the logic control unit of a digital computer may be used to generate and supply the various signals used in operating the memory system.

Figure 2:
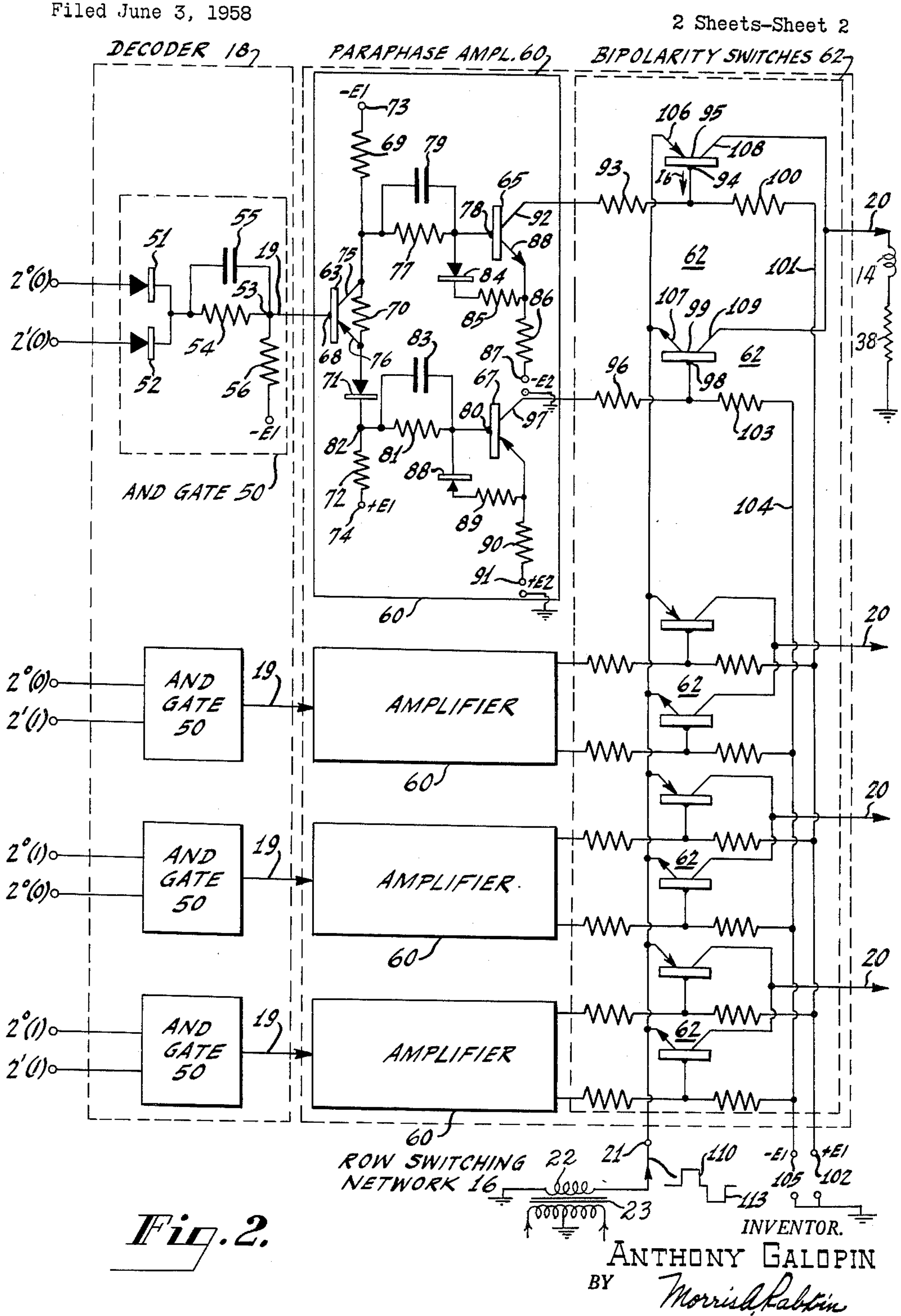
FIG. 2 is a schematic diagram of a switching network useful in the system of FIG. 1.

A more detailed arrangement of the row decoder 18 and the row switching network 16 is shown in FIG. 2. The decoder 18, for example, includes four two-input diode "and" gate units 50, each responsive to a different combination of the two binary signals $2^0$ and $2^1$. The diodes 51 and 52 of the coupled row "and" gate 50 each has its cathode connected to a common junction 53 via the parallel network of a resistance element 54 and a capacitor 55. The resistance-capacitor network is the well known speed-up network used in direct coupled transistor circuits. Another resistance element 56 connects the common junction 53 to the negative terminal 57 of a supply source E1. The topmost output line 19 of the decoder 18 also is connected to the common junction 53. Each of the other three "and" gates 50 of the decoder 18 is similarly arranged.

The row switching network 16 includes, for example, four paraphase amplifier units 60 and four bipolarity transistor switches 62. Each paraphase amplifier 60 is similar and each includes an input transistor 63 and a pair of output transistors 65 and 67. The input transistor 63, for example, is of the PNP conductivity type. The pair of output transistors 65 and 67 are of mutually opposite conductivity types, for example, NPN and PNP respectively. Each bipolarity switch means having transistors of opposite conductivity types is arranged so that the collector-base and emitter-base diodes have their forward directions toward the base or common terminal in the pair of diodes of one semi-conductor device and away from the base in the pair of diodes of the opposite conductivity semi-conductor device. Conduction of the respective transistors in the bipolarity switches 62 will be selected by means of the net effect of reverse biases from bipolarity source E1 and the forward biases from source E2 controlled by the paraphase amplifier 60. As seen in FIGURE 2, the biasing potentials of different polarities are indicated as +E1, −E1, +E2 and −E2. The topmost output line 19 of the decoder 18 is connected directly to the base electrode 68 of the input transistor 63. A voltage divider unit is connected between the negative and positive terminals 73 and 74 of a supply source, for example, the source E1. The voltage divider includes a first resistance element 69, a second resistance element 70, a breakdown diode 71 and a third resistance element 72. The breakdown diode 71 may be a Zener type diode. The collector and emitter electrodes 75 and 76 of the input transistor 63 are connected across the second resistance element 70. The input transistor collector 75 is also directly connected via a resistance element 77 to the base electrode 78 of the upper output transistor 65. A speed-up capacitor 79 is connected across the resistor 77. Another speed-up network of a resistor 81 and a capacitor 83 connects the base electrode 80 of the second output transistor 67 to a junction point 82 of the voltage divider unit. The junction point 82 is located between the cathode of the breakdown diode 71 and the upper terminal of the third resistance element 72. A current clamp including a diode 84, a first resistance element 85 and a second resistance element 86 connects the base electrode 78 of the first output transistor 65 to the negative terminal 87 of a source E2 of supply potential. The emitter electrode 88 of the output transistor 65 is connected at a junction point between the first and second resistors 85 and 86 of the current clamp. The diode 84 is poled in the easy direction of current flow from the base electrode 78 towards the negative terminal 87 of the supply source E2. A similar current clamp including a diode 88, a first resistance element 89 and a second resistance element 90 connects the base electrode 90 of the second output transistor 67 to the positive terminal 91 of the supply source E2. The diode 88 is poled in the easy direction of current flow from the supply terminal 91 to the base electrode 80 of the second output transistor 67.

A resistor 93 is used to connect the collector 80 of the first output transistor 65 to the base 94 of a first transistor 95 of the uppermost bipolarity transistor switch 62. The first switch transistor 95 is of the PNP conductivity type. Another resistor 96 is used to connect the collector 97 of the second output transistor 67 to the base 98 of a second transistor 99 of the bipolarity switch 62. The second switch transistor 99 is of the NPN conductivity type. A separate resistor 100 connects the base 94 of each first switch transistor 95 to a common supply bus 101. The common supply bus 101 is connected to the positive terminal 102 of a supply source, for example, the source E1. Another separate resistor 103 connects the base 98 of each second switch transistor 99 to a second common supply bus 104. The second supply bus 104 is connected to the negative terminal 105 of the supply source, for example, the supply source E1. The emitter electrodes 106 and 107 of the first and second switch transistors 95 and 99 are connected to the common input terminal 21 of the switching network 16. Both the collectors 108 and 109 of the first and second switch transistors 95 and 99 of each different switch 62 are connected in parallel to a different one of the output lines 20 of the switching network 16.

In operation, each of the switch transistors is normally non-conductive due to the reverse bias potentials supplied to their bases 94 and 98 by the supply source E1. Thus, both the diodes of each transistor 95 and 99 are reverse biased. When the two binary signals $2^0$ and $2^1$ are applied to the decoder 18, the corresponding one of the "and" gates 50 is activated. The activated "and" gate 50 applies a negative polarity base input signal to the input transistor 63 of the connected paraphase amplifier 60. The negative base input signal causes the input transistor 63 to become fully conductive. When the input transistor 63 conducts, a positive base input signal is applied to the NPN transistor 65 and a negative base input signal is applied to the PNP transistor 67. The two base input signals are of equal amplitude but of opposite polarity. The breakdown diode 71 in the voltage dividing unit maintains a constant potential difference between the two base input signals. In the absence of the breakdown diode 71, the two base input signals would be at the same potential due to the short circuiting of the resistor 70 when the input transistor 63 becomes fully conducting. The base input signals cause the two output transistors 65 and 67 to become fully conducting, thereby applying base input signals to the two switch transistors 95 and 99. The base input signals to the transistors 95 and 99 forward biases the emitter-base and collector-base diodes of each of the connected switch transistors 95 and 99. Accordingly in the PNP transistor 95, a collector-to-base current flows from the common ground through the collector-base diode, through the resistor 93, then through the fully-conducting output transistor 65 and the resistor 86, and then through the supply source E2 back to the common ground. The potential of the supply source E1 is greater in amplitude than the potential of the supply source E2. The emitter-base current of the PNP switch transistor 95 flows from the common ground, through the emitter-base diode, through the resistor 93, the NPN output transistor 65, the resistor 86 and the supply source E2 to the common ground. Similar paths for the base-emitter and base-collector current flow in the NPN switch transistor 99 and can be traced between the supply source E2 and the common ground. These two base currents together cause an appreciable base current flow in each of the switch transistors 95 and 99 of the selected switch 62. This type of base current flow in the switch transistors 95 and 99 is referred to herein as double-ended saturation because both diodes of the transistor contribute to the base current flow.

Any desired time after the switch transistors 95 and 99 are thus selected, a positive read pulse indicated by the pulse 110 of FIG. 2 is applied to the common input terminal 21 of switching network 16. The positive read pulse 110 flows through the emitter-collector path of the PNP switch transistor 95 of the switch 62 to the connected output line 20. The positive read current 110 is passed by the transistor 95 with negligible distortion and attenuation since the transistor 95 is in its saturation condition throughout the duration of the read pulse 110. Substantially no current flows in the emitter-base path due to the application of the read pulse 110 because of the relatively high impedance presented to the pulse 110 by the base resistors 93 and 100. In practice, each base resistor may have a resistance value one hundred or more times greater than the resistance coupled in the collector-to-emitter path.

The timing diagram of FIG. 3 illustrates one cycle of switch operation. The negative pulse 108 of line *a* of FIG. 3 represents a binary signal $2^0$ or $2^1$ applied to the decoder 18 at a time *t0*. The binary signals activate the desired paraphase amplifier 60 to select the desired switch 62 transistors 95 and 99. At a later time *t1*, the positive read pulse 110′ of line *b* of FIG. 3 is applied. During the rise time of its leading edge 111, between the times *t1* and *t2*, the appreciable base current of the PNP switch transistor 95 is maintained substantially unchanged due to the current flow in its emitter-base diode. The read pulse 110′ is maintained at a constant amplitude until the time *t3* and is terminated at a time *t4*. During the fall time of the trailing edge 112 of the read pulses 110′, the appreciable base current of the PNP switch transistor is maintained substantially unchanged due to the current flow in its collector-base diode. Therefore, throughout the entire duration of the read pulse 110′, the appreciable base current flow of the PNP transistor 95 is maintained substantially constant. This double-ended saturation should be contrasted with certain prior transistor switches which maintained appreciable base current flow only during a portion of the read pulse, say between the times *t1* and *t3*. The transistors of these prior switches then were subject to dissipation effects during the remaining portion of the read pulse. The dissipation is appreciable because of the relatively large amplitude currents that are switched, say currents of between 100 and 350 milliamperes. Thus, in the prior switches, the dissipation effect required both a careful selection of transistor type and a careful grading of the type transistor selected.

At any desired later time a negative write pulse indicated by the negative pulse 113 is applied to the common input terminal 21. This negative pulse 113 is passed through the emitter-collector path of the selected NPN switch transistor 99 to the same output line 20. The negative pulse 113 is used in writing information into the memory system. The appreciable base current flow of the selected NPN switch transistor 99 remains substantially unchanged for the entire duration of the negative write pulse 113. The negative read pulse is indicated in line *b* of FIG. 3 by the negative pulse 113′ which is applied between the times *t5* and *t8*. The current flow in the base-collector diode of the NPN transistor maintains the base current flow during the leading edge of the write pulse 113′, between the times *t5* and *t6*. The current flow in the base-emitter diode of the NPN switch transistor 99 maintains the base current flow during the trailing edge of the write pulse 113′, between the times *t7* and *t8*. At any later time *t9*, the address signal 108 is terminated. Accordingly, the dissipation in the transistors of the selected switch 62 is negligible during either the read portion or the write portion of the operating cycle. In practice, the resistance of the collector-to-emitter current path of the saturated switch transistor is in the order of a few ohms. Each of the remaining transistors of the non-selected switches 62 is effectively open-circuited to the read and write pulses 110 and 112.

After the termination of the memory cycle, a new combination of the binary address signals $2^0$ and $2^1$ can be used to select another desired one of the output lines 20 in similar fashion.

Another embodiment of a transistor switching network 120, according to the invention, is shown in FIG. 4. Those elements of FIG. 4 that correspond to similar elements of FIG. 2 are designated by similar reference numerals, with the addition of a prime. The switching network 120 of FIG. 4 uses a separate switch transistor of the so called symmetrical type to control each of the output lines 20′. The symmetrical transistors 122 may be of the NPN conductivity type. Each transistor 122 has a base electrode 124 and a pair of other electrodes 126 and 128. The electrodes 126 and 128 may operate either as emitter or collector electrodes depending upon the polarity of the drive pulse applied to the common input terminal 21′. Each of the base electrodes 124 is connected to the negative terminal 126 of a supply source E3 which has its positive terminal 128 connected to the common ground.

The operation of the switching network 120 is similar to that of the switching network 16 of FIG. 2. Thus, each of the transistor switches 122 is normally in its non-conductive condition. A desired one of the signal input lines 19′ is selected in accordance with the combination of the binary signals applied to the decoder 18. The selected input line 19′ applies a negative selecting signal to the base electrode 124 of the selected transistor 122. This negative signal causes an appreciable base saturation current flow through the pair of semiconductor diodes of that transistor. Thus, a positive read pulse 110″ applied to the common input terminal 21′ is passed through the selected transistor 122, from the electrode 126 to the other electrode 128, to the connected output line 20′. The pulse 110″ is passed with negligible distortion in waveshape and with negligible attenuation. A negative write pulse 112″ applied to the common input terminal 21′ is passed through the selected transistor 122 from the electrode 128 to the other electrode 126 in a similar manner. If desired, symmetrical transistors of the PNP conductivity type may be used by suitably poling the supply sources and the base input signals.

There have been described herein improved transistor switching networks which are relatively simple in construction and efficient in operation. Due to the double-ended saturation of the selected switch transistors, a relatively large amplitude pulse is transmitted to the ouput line of the switching network with relatively little attenuation or distortion.

The transistor switches, according to the invention, may be operated with a relatively high duty factor without undue dissipation. Also, because of the low dissipation, the grading requirement of the switch transistors is greatly reduced and switch transistors having a wider range of operating parameters may be used. The switching networks of the invention may be provided with conventional PNP or NPN type transistors, or with special symmetrical transistors.

What is claimed is:

1. A switching network comprising a plurality of transistors each having a base, emitter and a collector electrode, said emitter and collector electrodes providing with said base electrode a pair of semiconductor diodes, certain of said transistors being of the one conductivity type and the remaining ones of said transistors being of the opposite conductivity type, a first bias means for reverse biasing said pair of diodes of all said one conductivity type transistors, second bias means for reverse biasing said pair of diodes of all said opposite conductivity type transistors, a plurality of output lines each connected to the collector electrodes of a different pair of said transistors, one transistor of said pair being of one conductivity type and the other transistor of said pair being of the opposite conductivity type, means for forward biasing the said pair of diodes of both transistors of a desired one of said pairs, and means for applying during said biasing first and second pulses of opposite polarities to all the emitter electrodes of said transistors, said one polarity pulse being passed by the said one conductivity type transistor of said desired pair, and said opposite polarity pulse being passed by the opposite conductivity type transistor of said desired pair to the said output line connected to said desired pair.

2. A switching apparatus comprising an input terminal and an output terminal, first multi-electrode semi-conductor means connected between said terminals and operating as a first pair of diodes having a common terminal toward which said diodes are connected in the forward direction, said diodes having electrodes apart from said common terminal, with means to connect said electrodes, respectively, to said input and output terminals, first bias means for reverse biasing said first pair of diodes, second multi-electrode semi-conductor means connected between said terminals and operating as a second pair of diodes having a common terminal to which each diode is connected with the forward directions of said second pair of diodes away from their common terminal, said second pair of diodes having two electrodes, apart from their common terminal, with means for connecting said lastmentioned electrodes to said input and output terminals, respectively, second bias means for reverse biasing said second pair of diodes, means for actuating said semi-conductor means to enable passage of pulses from the input terminal to the output terminal including further bias means connected to the respective common terminals for forward biasing both diodes of each pair of diodes and means for applying to said input terminal during said forward biasing first and second pulses of opposite polarity, said first polarity pulse being passed only by one pair of diodes to said output terminal, and said second pulse of opposite polarity being passed only by the other pair of diodes to said output terminal.

3. A switching network comprising an input terminal means, a plurality of output terminal means, a bipolarity switch means connected between each output terminal means and said input terminal means, each bipolarity switch means including first multi-electrode semi-conductor means operating as a first pair of diodes having a common terminal toward which the diodes are connected in the forward direction and second multi-electrode semi-conductor means operating as a second pair of diodes having a common terminal with the diodes of said second pair connected with their forward directions away from their common terminal, each pair of diodes having electrodes, apart from their common terminal, connected, respectively, to said input terminal means and to the output terminal means of the respective switch means, first bias means connected to said switch means for reverse biasing both diodes of each said first pair of diodes, second bias means connected to said switch means for reverse biasing both diodes of each said second pair of diodes, means for applying to said input terminal first and second pulses of opposite polarity and control means including further forward bias means connected to the respective common terminals for selectively activating each said switch means to pass said first and second pulses of opposite polarity from said input terminal means to said output terminal means, said first polarity pulse being passed to said output terminal means only by one pair of diodes of an activated switch means and the second pulse of opposite polarity being passed to the output terminal means only by the other pair of diodes of the activated switch means.

References Cited in the file of this patent

UNITED STATES PATENTS

| | | |
|---|---|---|
| 2,618,753 | Van Mierlo | Nov. 18, 1952 |
| 2,627,039 | MacWilliams | Jan. 27, 1953 |
| 2,817,757 | Durbin | Dec. 24, 1957 |
| 2,820,153 | Woll | Jan. 14, 1958 |
| 2,825,889 | Henle | Mar. 4, 1958 |
| 2,829,281 | Van Overbeek | Apr. 1, 1958 |
| 2,877,451 | Williams | Mar. 10, 1959 |

FOREIGN PATENTS

| | | |
|---|---|---|
| 736,760 | Great Britain | Sept. 14, 1955 |